O. A. YOUNGGREN.
CATCHER'S MASK.
APPLICATION FILED AUG. 26, 1912.
1,072,802. Patented Sept. 9, 1913.
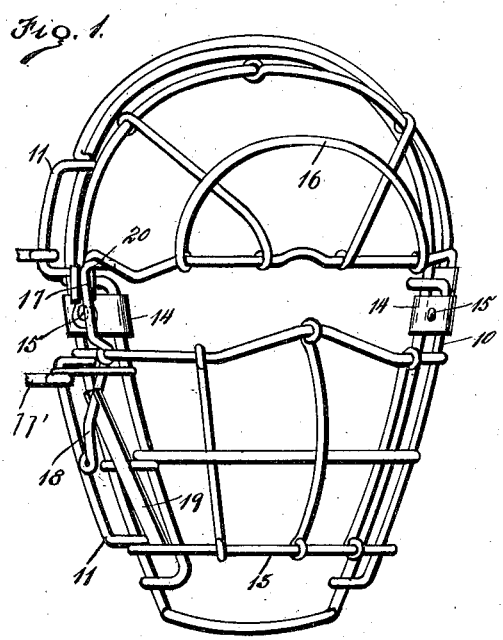
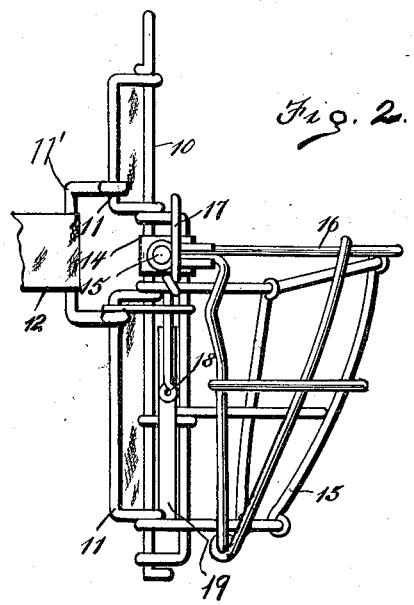
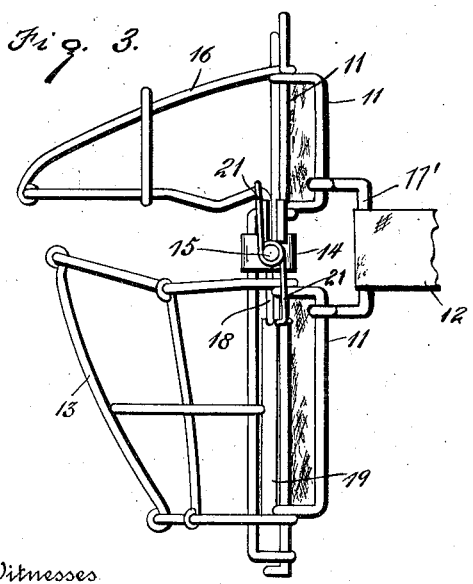
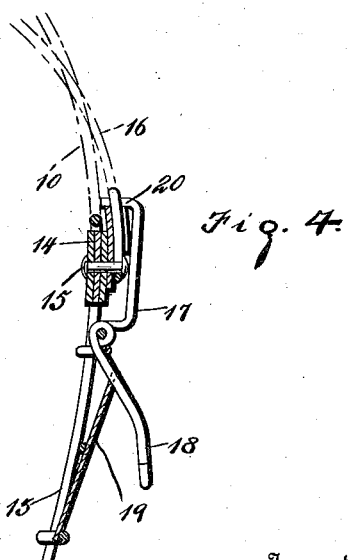

UNITED STATES PATENT OFFICE.

OSCAR A. YOUNGGREN, OF KEWANEE, ILLINOIS.

CATCHER'S MASK.

1,072,802.  Specification of Letters Patent.  Patented Sept. 9, 1913.

Application filed August 26, 1912. Serial No. 717,105.

*To all whom it may concern:*

Be it known that I, OSCAR A. YOUNGGREN, a citizen of the United States, residing at Kewanee, in the county of Henry, State of Illinois, have invented certain new and useful Improvements in Catchers' Masks; and I do hereby declare the following to be a full, clear, and exact description of the invention, such as will enable others skilled in the art to which it appertains to make and use the same.

This invention relates to improvements in baseball masks, and has particular reference to a catcher's mask.

The principal object of the invention is to provide a novel form of catcher's mask which may be quickly thrown from the front of the face so that the catcher may have his view unobstructed when trying to catch foul flies.

Other objects and advantages will be apparent from the following description and with particular reference to the accompanying drawings.

In the drawings: Figure 1 is a perspective view of a catcher's mask made in accordance with my invention, Fig. 2 is a side elevation showing the device open, Fig. 3 is an enlarged side elevation of the side of the mask, opposite to that shown in Fig. 2, Fig. 4 is a vertical longitudinal sectional view through the detent carrying side of the mask at the hinged joint.

Referring particularly to the accompanying drawings, 10 represents the head and face frame of a base ball catcher's mask of the usual form, said frame having the rearwardly extending loops 11, for attachment of the usual padding and a loop 11' for the head strap 12. The lower portion of the frame has the outwardly projecting lower cage portion 13, of the usual construction. The usual mask for this purpose is divided into upper and lower cage portions on each side of the frame and just above the lower cage portion is secured the plate 14, carrying a pivot pin 15. Pivotally mounted on these pins is an upper cage section 16, which extends forwardly and covers the upper portion of the face of the wearer and is of slightly greater size than the lower cage portion so that when it swings downwardly it will easily fit around the said lower cage portion. Pivotally mounted on either side of the frame according to whether the catcher is right or left-handed is the latch member 17, having an operating stem 18, projecting downwardly and slightly outwardly from the frame. A leaf spring 19 secured on the frame 10 engages the operating stem and forces the same normally outward so that its upper inwardly extending end 20 will engage under the lower edge of the upper cage section and normally support the same in upward elevated position. On the pivot pin on the side of the frame opposite to that which carries the latch 17 is mounted a coiled spring 21, one end of which is attached to the frame 10, and the other end of which bears against the upper cage section, so that the normal tendency would be to move the section downwardly on its pivot.

In the use of the ordinary catcher's mask, when the catcher makes an attempt to catch a high foul fly, he usually throws both hands to the sides of the mask to remove the same, so that he may have a clear upward view at the ball. This, and the readjusting of the mask in a comfortable position consumes considerable time as it is almost imposible, after once removing the mask to place the same again on the head in the axact spot where it was at first.

In the operation of my mask, I take advantage of the fact that a catcher throws up his hands in the manner of removing the mask. When the hand engages against the operating stem of the pivoted latch, the same will be rocked on its pivot, so that the inturned upward end will be withdrawn from under the edge of the pivoted section of the mask. When so released, the coiled spring imparts the initial movement to the pivoted section, gravity completing the movement so that the section uncovers the upper half of the mask and permits the catcher to have a clear and unobstructed view. To place the mask in condition to protect the face from the ball in further play in the game, the upper section is raised and the pivoted latch moves so that its inwardly projected upward end will be out of the path of the edge of the frame of the upper section, until the section has been raised far enough to permit its lower edge to rest on the inwardly projected end of the latch. In this way it will be seen that the mask does not have to be removed from the head, but remains in the comfortable position in which it was adjusted when first applied, the annoyance of taking off and putting on the mask being obviated as well as the disagreeable feature of the mask getting dirty when thrown to the ground and having this dirt wiped on to the face when the mask is again put on.

What is claimed is:

1. In a base ball catcher's mask, a frame an upper movable section and a lower rigid section, and manually operated means for releasing the upper section to permit the same to drop over the lower section.

2. In a base ball catcher's mask, a frame upper and lower openwork sections on the frame, the lower section being slightly smaller than the upper section, the upper section being pivoted to the frame, springs connected to the upper section and to the frame and having a tendency to move the upper section from normal position, and means on the frame for releasing the upper section, whereby the upper section of the mask will be permitted to drop over the lower section.

3. A base ball catcher's mask having a movable upper section, means for holding the movable section in elevated position, means for releasing the holding means to permit the section to fall, and means for imparting an initial movement to the said section.

In testimony whereof, I affix my signature, in presence of two witnesses.

OSCAR A. YOUNGGREN.

Witnesses:
ROBERT C. MORSE,
MARJORIE NOKES.

---

Copies of this patent may be obtained for five cents each, by addressing the "Commissioner of Patents, Washington, D. C."